United States Patent
Wu (10) Patent No.: US 10,522,173 B1
(45) Date of Patent: Dec. 31, 2019

(54) MAGNETIC READ HEAD STRUCTURE WITH IMPROVED BOTTOM SHIELD DESIGN FOR BETTER READER PERFORMANCE

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/007,014

(22) Filed: Jun. 13, 2018

(51) Int. Cl.
  *G11B 5/39* (2006.01)
  *G11B 5/11* (2006.01)

(52) U.S. Cl.
  CPC ............. *G11B 5/3912* (2013.01); *G11B 5/11* (2013.01); *G11B 5/3932* (2013.01); *G11B 5/3951* (2013.01); *G11B 5/3967* (2013.01); *G11B 2005/3996* (2013.01)

(58) Field of Classification Search
  None
  See application file for complete search history.

(56) References Cited

U.S. PATENT DOCUMENTS

| | | | |
|---|---|---|---|
| 8,179,642 B2 | 5/2012 | Kawamori et al. | |
| 8,503,135 B2 | 8/2013 | Covington et al. | |
| 8,638,530 B1 * | 1/2014 | Hsu et al. | G11B 5/3912 360/319 |
| 8,780,506 B1 * | 7/2014 | Maat et al. | G11B 5/3912 360/319 |
| 9,111,550 B1 | 8/2015 | Liu et al. | |
| 9,230,576 B1 * | 1/2016 | Gill et al. | G11B 5/3912 |
| 9,230,577 B2 | 1/2016 | Zhang et al. | |
| 9,870,790 B1 | 1/2018 | Hassan et al. | |
| 10,074,387 B1 * | 9/2018 | Xiao et al. | G11B 5/3912 |
| 2007/0081277 A1 | 4/2007 | Folks et al. | |
| 2009/0279213 A1 | 11/2009 | Wu et al. | |
| 2011/0051291 A1 | 3/2011 | Miyauchi et al. | |

(Continued)

OTHER PUBLICATIONS

"An Areal-Density Capability Study of SMR by using improved Write and Read Heads," by T. Kagami et al., Intermag 2011, IEICE Technical Committee Submission System, Conference Paper's Information, 3 pgs., Nov. 18, 2011.

*Primary Examiner* — Craig A. Renner
(74) *Attorney, Agent, or Firm* — Saile Ackerman LLC; Stephen B. Ackerman (57) ABSTRACT

A bottom shield in a read head is modified by including a non-magnetic decoupling layer and second magnetic layer on a conventional first magnetic layer. The second magnetic layer has a magnetization that is not exchange coupled to the first magnetic layer, and a domain structure that is not directly affected by stray fields due to domain wall motion in the first magnetic layer. Accordingly, the modified bottom shield reduces shield related noise on the reader and will provide improved signal to noise (SNR) ratio and better reader stability. The second magnetic layer may be further stabilized with one or both of an antiferromagnetic coupling scheme, and insertion of an antiferromagnetic pinning layer. In dual readers, the modified bottom shield is used in either the bottom or top reader although in the latter, first magnetic layer thickness is reduced to maintain reader-to-reader spacing and acceptable bit error rate (BER).

8 Claims, 9 Drawing Sheets

(56) References Cited

U.S. PATENT DOCUMENTS

| | | |
|---|---|---|
| 2011/0069417 A1 | 3/2011 | Kawamori et al. |
| 2011/0090595 A1 | 4/2011 | Hirata et al. |
| 2011/0279923 A1* | 11/2011 | Miyauchi et al. ... G11B 5/3912 360/319 |
| 2012/0281320 A1* | 11/2012 | Singleton et al. ... G11B 5/3912 360/319 |
| 2012/0327537 A1* | 12/2012 | Singleton et al. ... G11B 5/3912 360/244 |
| 2015/0170686 A1* | 6/2015 | Singleton et al. ... G11B 5/3912 360/319 |
| 2015/0325260 A1* | 11/2015 | Singleton et al. ... G11B 5/3912 360/319 |
| 2018/0144766 A1* | 5/2018 | Quan et al. ......... G11B 5/3912 |

* cited by examiner

MAGNETIC READ HEAD STRUCTURE WITH IMPROVED BOTTOM SHIELD DESIGN FOR BETTER READER PERFORMANCE

RELATED PATENT APPLICATION

This application is related to the following: U.S. Pat. No. 9,230,577; assigned to a common assignee and herein incorporated by reference in its entirety.

TECHNICAL FIELD

The present disclosure relates to an improved bottom shield design for stabilizing free layer magnetization in a single reader or dual reader (2DMR) scheme, and in particular to a bottom shield stack comprised of a non-magnetic decoupling layer, and an uppermost magnetic layer with enhanced domain stability that is formed between a bottommost magnetic layer in the bottom shield and a bottom surface of a sensor in the reader structure.

BACKGROUND

In a magnetic recording device in which a read head comprises a magnetoresistive (MR) sensor, there is a constant drive to increase recording density. One trend used in the industry to achieve this objective is to decrease the size of the MR sensor. Typically, the sensor stack has two ferromagnetic layers that are separated by a non-magnetic layer. One of the ferromagnetic layers is a reference or pinned layer wherein the magnetization direction is fixed by exchange coupling with an adjacent antiferromagnetic (AFM) pinning layer. The second ferromagnetic layer is a free layer with a magnetization that rotates in response to external magnetic fields, and is rotated towards either parallel or anti-parallel to the magnetization in the pinned layer to read out the local orientation of magnetic moment in the recording media. When passing the MR sensor over a recording medium at an air bearing surface (ABS), the free layer magnetic moment will rotate according to the local magnetic field generated by the recording media. By processing the angle of rotation as a function of location on the media, the data pattern recorded on the media can be decoded. A MR sensor may be based on a tunneling magnetoresistive effect where the two ferromagnetic layers are separated by a thin non-magnetic dielectric layer. A sense current is used to detect a resistance value, which is lowest when the moments from the two layers are parallel to each other and is the highest when the two moments are anti-parallel to each other. In a current perpendicular-to-plane (CPP) configuration, a sense current is passed from a top shield through the sensor layers to a bottom shield, or in the reverse direction.

A longitudinal biasing scheme is typically used in a read head design to keep the free layer in a stable orientation in the absence of the external magnetic field. Bias films of high coercivity or soft bias also known as junction shields, are abutted against the edges of the MR sensor and particularly against the sides of the free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for MR sensor elements become smaller with higher recording density requirements, the free layer becomes more volatile and more difficult to bias. Top and bottom magnetic shields with in-plane magnetization are often used to ensure the MR sensor will only respond to a local magnetic field. However, free layer magnetization is sensitive to domain wall motion in the bottom and top shield, which may lead to increased noise, reducing the signal to noise (SNR) ratio of the reader sensor and cause failure in decoding data from the media.

In recent years, 2DMR configurations have become attractive from an areal density improvement standpoint. However, shield stability is more difficult to control in 2DMR schemes because of a requirement to shrink reader-to-reader spacing (RRS), and in view of repeated thermal treatments during recording head fabrication that can readily change the magnetization orientation in the shields. Shield instability will directly translate into reader instability and will adversely impact SNR and bit error rate (BER). A new read head structure is needed wherein shield stability is improved while maintaining acceptable SNR and BER.

SUMMARY

One objective of the present disclosure is to provide a bottom shield design that enables improved stability in the shield and also to have improved free layer magnetization in a single reader, or in one or both readers in a 2DMR structure.

A second objective of the present disclosure is to provide a method of forming the bottom shield structure according to the first objective.

According to one embodiment of the present disclosure where a reader comprises a MR sensor formed between a bottom shield and a top shield, the bottom shield structure has a stack of layers wherein a non-magnetic decoupling layer and a second magnetic layer with a magnetization saturation (Ms) value from 5 kiloGauss (kG) to 15 kG are sequentially formed on a first magnetic layer. The first magnetic layer has a thickness greater than the overlying decoupling layer and second magnetic layer, and also has a Ms value from 5 kG to 15 kG. The decoupling layer is made of a conductive material such as one or more of Cu, Al, W, Cr, Ta, Ru, Pt, and Pd, or is an insulating material including but not limited to a metal oxide that is $Al_2O_3$, $SiO_2$, MgO, $Ta_2O_5$, and $TiO_2$, and has a thickness that is sufficient to prevent magnetic coupling between the first and second magnetic layers.

The second magnetic layer is comprised of one or more of FeCo, FeCoNi, FeCoN, NiFe, NiFeW, NiFeCr, NiFeMo, or alloys thereof such as FeCoR where R is Mo, Zr, Nb, Hf, Ru, Pt, Re, Pd, or a combination thereof, and has a thickness from about 1 nm to 1 micron. In some embodiments, the second magnetic layer is a single layer with an in-plane magnetization aligned in the same direction as overlying junction shields on each side of a free layer in the MR sensor. In an alternative embodiment, the second magnetic layer is a trilayer in which an antiferromagnetic (AF) coupling layer is sandwiched between two ferromagnetic layers (FM1 and FM2) in a FM1/AF coupling layer/FM2 configuration to stabilize the magnetization. In yet another embodiment, there may be an antiferromagnetic (AFM) layer inserted within the second magnetic layer to yield a FM1/AFM/FM2 configuration, or inserted between the decoupling layer (DL) and second magnetic (FM) layer to give a DL/AFM/FM or DL/AFM/FM1/AF coupling layer/FM2 stack of layers on the first magnetic layer. In some embodiments, the second magnetic layer may be comprised of amorphous materials such as CoTaZr to provide a smoother surface on which to fabricate the MR sensor. In preferred embodiments, the second magnetic layer has a fine grain structure to improve domain stability therein.

In one embodiment, the bottom shield structure of the present disclosure is formed in a single reader. According to a second embodiment, the bottom shield structure disclosed herein is employed in one or both of a bottom reader and a top reader in a 2DMR scheme.

The present disclosure also includes a process involving a sequence of steps to form the bottom shield including a physical vapor deposition (PVD) of the decoupling layer on the first magnetic layer, and then electroplating the second magnetic layer.

DETAILED DESCRIPTION

The present disclosure is a bottom shield design that provides improved magnetic stabilization in a read head that is a single reader or has a 2DMR configuration. The more stable bottom shield ensures there is less stray field that could act on the sensor element either directly or indirectly via magnetic coupling to other magnetic parts of the reader. Improved bottom shield stability translates into improved MR sensor (free layer) stability, as well as better SNR and BER. In the drawings, the y-axis is in a cross-track direction, the z-axis is in the down-track direction, and the x-axis is in a direction orthogonal to the ABS and towards a back end of the read head. The stabilized bottom shield design described herein is not limited to a particular read head structure, and is effective even in a reader in a multiple reader structure such as 3DMR. The terms "second" and "secondary" may be used interchangeably when referring to the upper layer in the bottom shield stack of layers. In addition, the terms "read head" and "reader" are used interchangeably.

Figure 1:
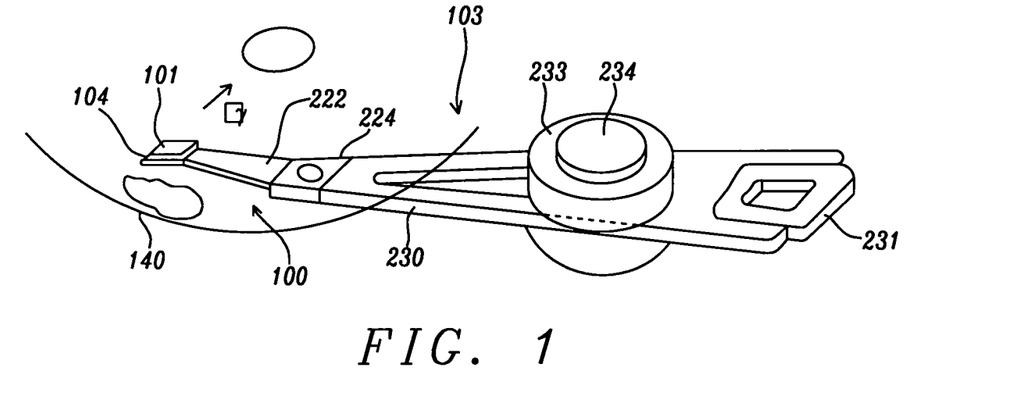
FIG. 1 is a perspective view of a head arm assembly of the present disclosure.

Referring to FIG. 1, a HGA 100 includes a magnetic recording head 101 comprised of a slider and a combined read-write structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
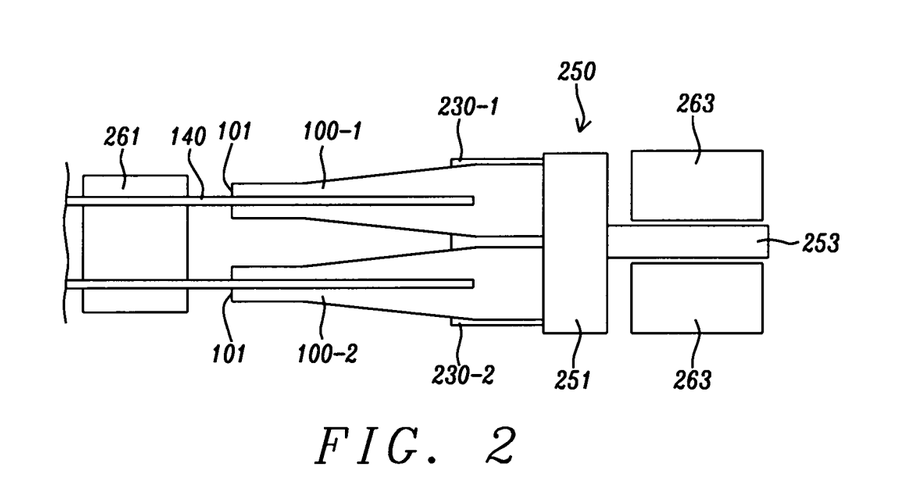
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion 253 of the voice coil motor is mounted at the opposite side of each arm in carriage 251. The voice coil motor has a permanent magnet 263 arranged at an opposite position across the coil 253.

Figure 3:
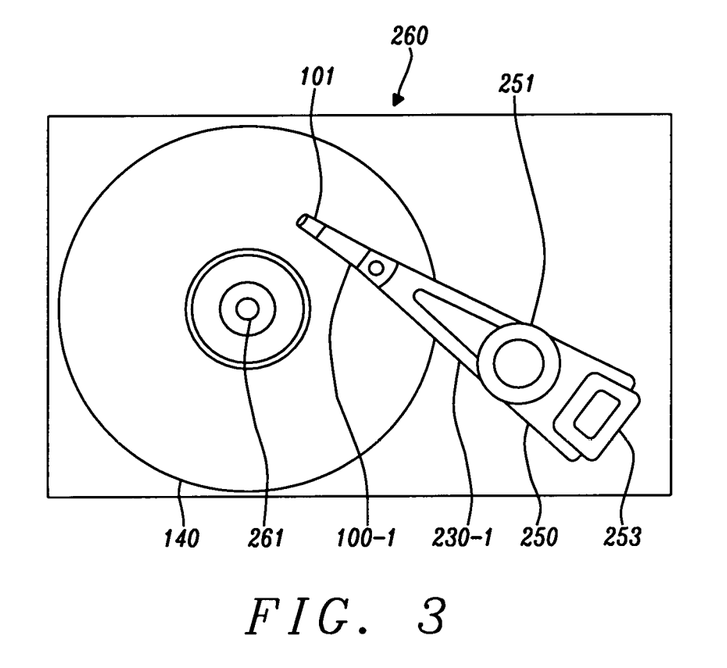
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to a spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a perpendicular magnetic recording (PMR) writer element (not shown) and reproduces the information recorded in the magnetic recording media by a magnetoresistive (MR) sensor element (not shown).

Figure 4:
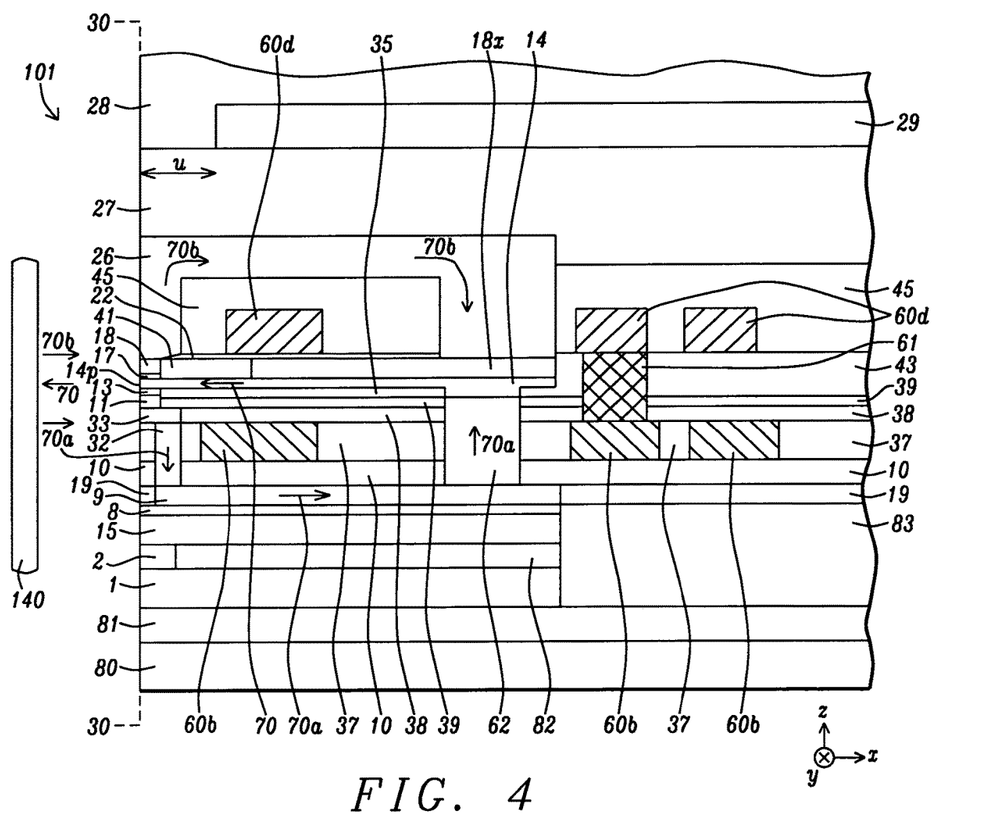
FIG. 4 is a down-track cross-sectional view of a combined read-write head wherein a single reader is formed between top and bottom shields in the read head portion according to an embodiment of the present disclosure.

Referring to FIG. 4, magnetic recording head 101 comprises a combined read-write head previously fabricated by the inventors and disclosed in related U.S. Pat. No. 9,230,577. The down-track cross-sectional view is taken along a plane formed orthogonal to the ABS 30-30, and that bisects the main pole layer 14. The read head is formed on a substrate 80 that may be comprised of AlTiC (alumina+TiC) with an overlying dielectric layer 81 that is made of a dielectric layer such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 1 is formed on dielectric layer 81.

A magnetoresistive (MR) element also known as MR sensor 2 is formed on bottom shield 1 at the ABS 30-30 and typically includes a plurality of layers that are described later with regard to FIG. 4. A top magnetic shield 15 is formed on the MR sensor. Layer 82 adjoins the backside of the MR sensor, and layer 83 contacts the backsides of the bottom shield and top shield. An insulation layer 8 and a top shield (S2B) layer 9 are sequentially formed on the top shield. Note that the S2B layer 9 may serve as a flux return path (RTP) in the write head portion of the combined read/write head. Thus, the portion of the combined read/write head structure formed below layer 9 in FIG. 4 is typically considered as the read head.

The present disclosure anticipates that various configurations of a write head (PMR writer) may be employed with the read head portion. In the exemplary embodiment, magnetic flux 70 in main pole layer 14 is generated with flowing a current through bucking coil 60b and driving coil 60d that are below and above the main pole layer, respectively, and are connected by interconnect 61. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, PP3 shield 26, and top yoke 18x. Layer 41 adjoins top yoke 18x. There is also a leading return loop for magnetic flux 70a that includes leading shield 11, leading shield connector (LSC) 33, S2 shield connector (S2C) 32, return path 9, and back gap connection (BGC) 62. The magnetic core may also comprise a bottom yoke 35 below the main pole layer. Dielectric layers 10, 13, 19, 22, 37-39, 43, and 45 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
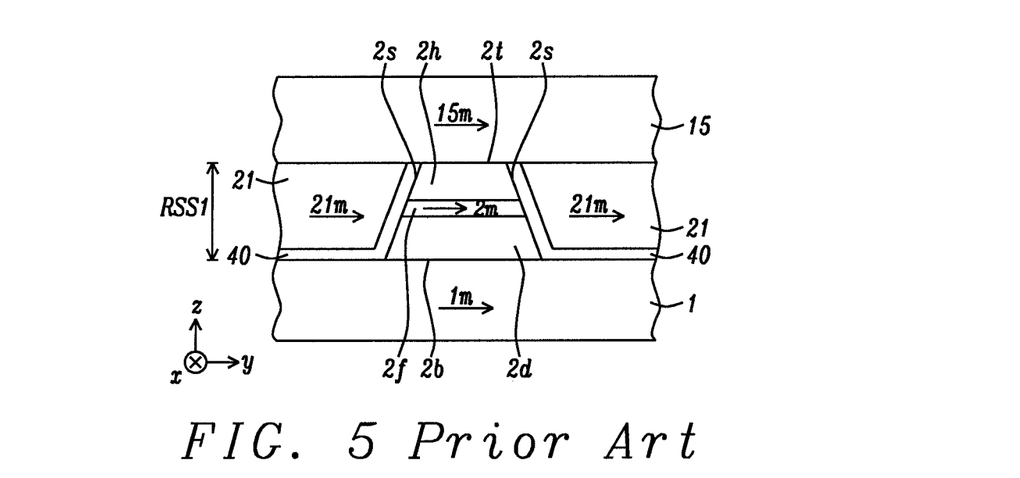
FIG. 5 is an ABS view of a prior art reader structure wherein a bottom shield is a single magnetic layer that is used to shield the reader from magnetic fields on the bottom shield side away from the sensor.

Referring to FIG. 5, an ABS view is shown of a portion of the read head including bottom shield 1, top shield 15, junction shields 21, and the MR sensor having a lower layer 2d, middle free layer 2f, and upper layer 2h that is formed on a center section of the bottom shield. Sidewalls 2s connect a bottom surface 2b with the top surface 2t of the MR sensor. There is a non-magnetic isolation layer 40 formed along the sidewalls 2s and on portions of the bottom shield that are not covered by the MR sensor. Magnetization 21m in the junction shields is primarily responsible for providing longitudinal biasing to the free layer. Magnetization 15m in the top shield stabilizes the magnetization direction in the junction shields through exchange coupling. Layer 2h comprises at least a capping layer, and layer 2d includes a reference layer with a fixed magnetization direction, and a non-magnetic spacer (not shown) between the reference layer and free layer 2f. Layer 2d may also include a bottommost seed layer, and an antiferromagnetic (AFM) layer such as IrMn or another Mn alloy may be formed on a side of the reference layer that faces away from the free layer to pin the magnetization direction in the reference layer. Shield-to-shield spacing is depicted as RSS1. In other embodiments, the AFM layer (not shown) may be recessed behind the MR sensor stack or embedded in a back portion of bottom shield 1 to satisfy reduced RSS1 requirements. The non-magnetic spacer may be comprised of one or more metal oxides, metal oxynitrides, or metal nitrides to provide a tunneling magnetoresistive effect.

Figure 6:
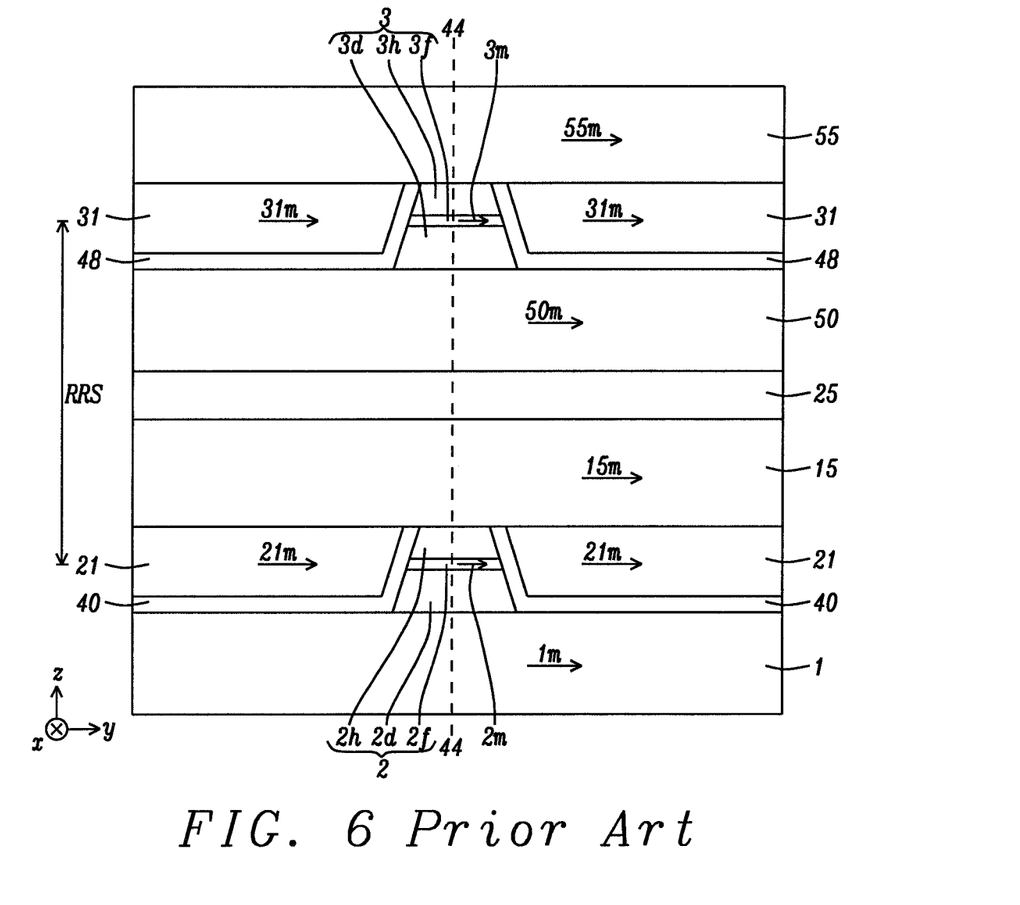
FIG. 6 is an ABS view of a 2DMR structure previously fabricated by the inventors wherein a first bottom shield and second bottom shield for shielding magnetic fields away from the sensor on the bottom shield side in a first reader and second reader, respectively.

A conventional 2DMR structure is shown in FIG. 6 wherein a first reader such as the reader structure in FIG. 5 is used as a bottom reader. Above first top shield 15 is an isolation (dielectric) layer 25 that magnetically and electrically isolates the first reader from a second (top) reader that includes a second MR sensor 3 comprised of bottom layer 3d, free layer 3f, and upper layer 3h where layers 3d, 3f, and 3h may have the same composition and function as layers 2d, 2f, and 2h, respectively. The second MR sensor is formed between a second bottom shield 50 with magnetization 50m and a second top shield 55. A second insulation layer 48 adjoins the sidewalls of the second MR sensor. Junction shields 31 formed on the second insulation layer have a magnetization 31m and are employed to provide a longitudinal bias to the free layer 3f magnetization direction. Magnetization 31m is in the same direction as magnetization 55m in the second top shield because of ferromagnetic coupling. Preferably, the second MR sensor is aligned above the first MR sensor such that center plane 44 bisects each of the aforementioned MR sensors. The center plane is orthogonal to the ABS. Here, reader-reader spacing RRS is depicted as the down-track distance from the center of the first reader to the center of the second reader.

Figure 7:
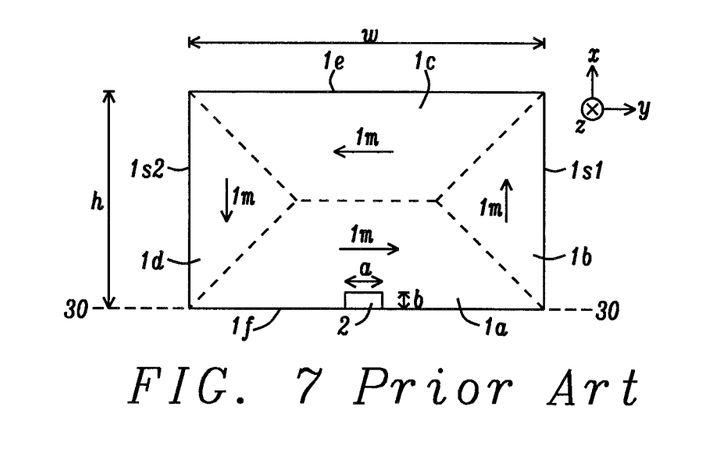
FIG. 7 is a top-down view of the reader in FIG. 5 showing the relative size of the reader and bottom shield, and a possible magnetization pattern within the bottom shield.

Referring to FIG. 7, a top-down view of MR sensor 2 on bottom shield 1 is shown with overlying layers removed. The MR sensor has width a, which is substantially smaller width than width w of the bottom shield, and height b substantially less than height h of the bottom shield. Moreover, the magnetic domains 1a-1d in the bottom shield may form a closed loop such that a first domain 1a proximate to front side 1f at the ABS 30-30 has a cross-track direction for magnetization 1m, and a back portion with domain 1c proximate to backside 1e has a magnetization 1m anti-parallel to that in the first domain. Side domains 1b, 1d adjacent to sides 1s1, 1s2, respectively, have anti-parallel magnetizations that are orthogonal to the ABS in order to form a closed loop for magnetization 1m in a counterclockwise direction.

Figure 8:
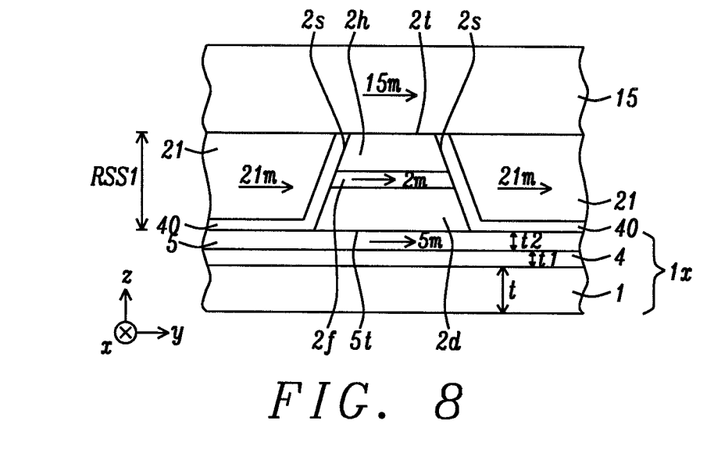
FIG. 8 is an ABS view of read head structure wherein a bottom shield is comprised of a non-magnetic decoupling layer and a second magnetic layer sequentially formed on a first magnetic layer according to an embodiment of the present disclosure.

According to a first embodiment of the present disclosure depicted in FIG. 8, the bottom shield in a single reader is modified to have a trilayer stack 1x wherein first magnetic (bottom shield) layer 1 is retained from the prior art, and a non-magnetic decoupling layer 4 with a thickness t1 from 1 nm to 0.5 micron, and a second magnetic layer 5 with a thickness t2 from 1 nm to 0.5 micron are sequentially formed thereon.

The first magnetic layer 1 has a thickness t greater than 0.5 micron, and preferably substantially greater than the second magnetic layer 5. The decoupling layer 4 is made of a conductive material such as one or more of Cu, Al, W, Cr, Ta, Ru, Pt, and Pd, or is an insulating material including but not limited to a metal oxide that is $Al_2O_3$, $SiO_2$, MgO, $Ta_2O_5$, or $TiO_2$, and has a thickness that is sufficient to prevent exchange coupling between the first magnetic layer and second magnetic layer.

Both of the first magnetic layer 1 and second magnetic layer 5 have a Ms value from 5 kG to 15 kG. Each of the first and second magnetic layers are comprised of one or more of FeCo, FeCoNi, FeCoN, NiFe, NiFeW, NiFeCr, NiFeMo, or alloys thereof such as FeCoR where R is Mo, Zr, Nb, Hf, Ru, Pt, Re, Pd, or a combination thereof. Preferably, a material is selected for the second magnetic layer that provides a stable domain in a cross-track direction (magnetization 5m) even in the presence of external magnetic fields, and is not susceptible to domain wall motion proximate to the sensor that leads to instability. Moreover, a material with a fine grain structure or amorphous character such as CoTaZr is beneficial in forming a smooth top surface 5t on which to build a MR sensor with better film uniformity, which in turn yields improved performance. Top shield 15, and junction shields 21 are generally comprised of CoFe, CoFeNi, CoFeN, or NiFe, or a combination thereof. In some embodiments, one or both of the top shield and junction shields may be comprised of stacks of magnetic materials separated by one or more non-magnetic materials (such as Ru, Cr, Rh, Ir, Mo, Re, and Os) that can provide antiferromagnetic coupling between the adjacent magnetic layers.

In the exemplary embodiment shown in FIG. 8, the second magnetic layer 5 is a single layer with in-plane magnetization 5m aligned in the same cross-track direction as magnetization 21m in overlying junction shields, and as magnetization 2m in free layer 2f. Magnetization 15m is ferromagnetically coupled to magnetization 21m that provides a bias field to stabilize free layer magnetization. Because of decoupling layer 4, domain wall motion that tends to form in the first magnetic layer 1 has no destabilization effect on magnetization in the second magnetic layer. Note that RSS1 is maintained compared with the prior art single reader in FIG. 5. However, a total thickness of bottom shield 1x is increased by (t1+t2) compared with the bottom shield in FIG. 5 if the thickness of the first magnetic layer is constant.

An important feature is that the first magnetic layer 1 is a greater down-track distance from free layer 2f in the embodiment shown in FIG. 8 than in the prior art MR sensor in FIG. 5. Accordingly, stray fields that may arise due to domain wall motion in the first magnetic layer have a significantly smaller effect on free layer magnetization in view of the greater separation from the MR sensor in FIG. 8.

Figure 9:
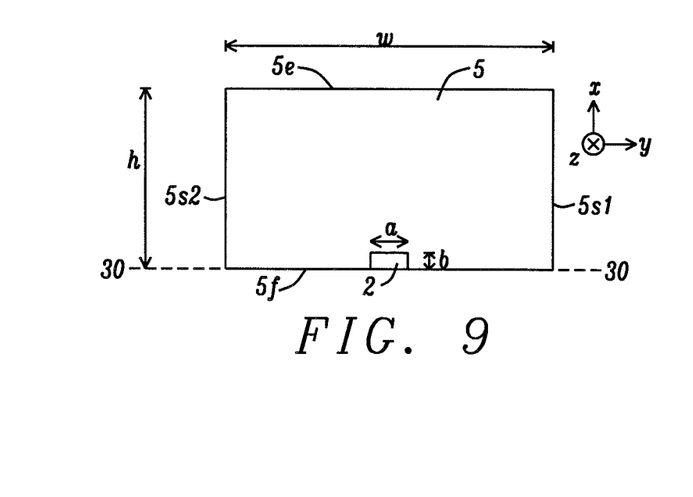
FIG. 9 is a top-down view of the second magnetic layer in FIG. 8 that has a width and height essentially equivalent to the width and height of the underlying first magnetic layer according to one embodiment of the present disclosure.

Referring to FIG. 9, a top-down view of the second magnetic layer 5 and MR sensor 2 is shown with overlying layers removed according to an embodiment of the present disclosure. In a preferred embodiment, the shape of the second magnetic layer including the width w between side 5s1 and side 5s2 and height h between a front side 5f at the ABS 30-30 and a backside 5e is optimized independent of the width and height of the underlying first magnetic layer for better shield stability.

Figure 10:
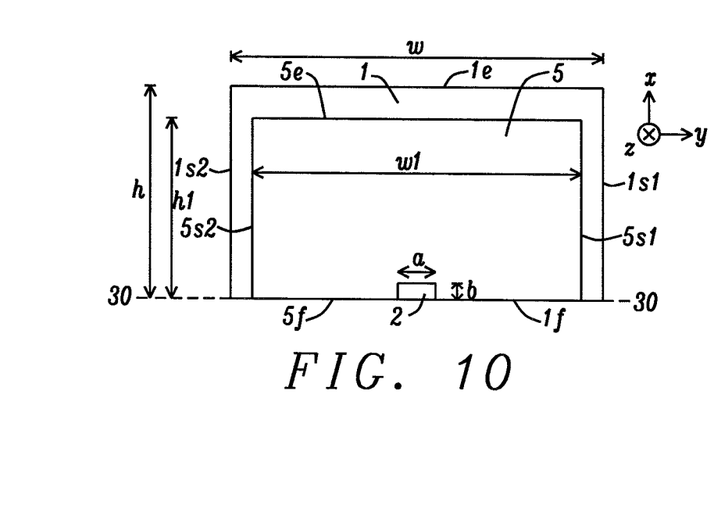
FIG. 10 is a top-down view of the second magnetic layer in FIG. 8 having a width and height less than the width and height of the underlying first magnetic layer according to another embodiment of the present disclosure.

As an example, in an alternative embodiment depicted in FIG. 10, height h1 and width w1 of the second magnetic layer 5 are less than height h and width w, respectively, of the first magnetic layer 1. However, height h1 is preferably at least 5× greater than height b of the MR sensor, and width w1 is preferably at least 5× greater than width a of the MR sensor in order to prevent stray fields (from domain wall motion) in the first magnetic layer from disrupting magnetization in the free layer.

Figure 11:
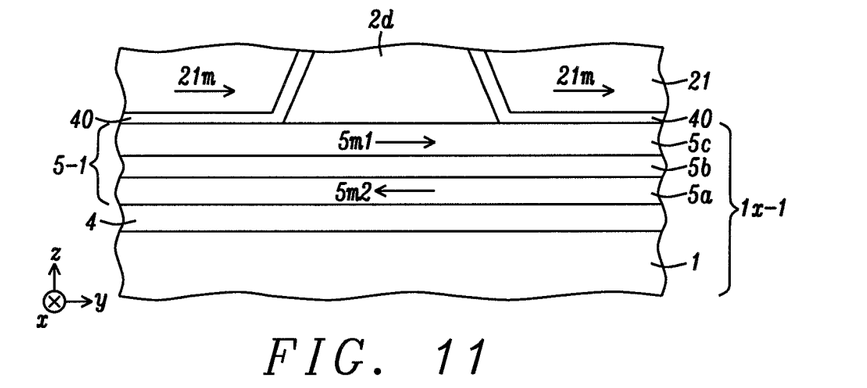
FIG. 11 is an ABS view of an alternative embodiment where the second magnetic layer in FIG. 8 has an AF coupling layer between two ferromagnetic (FM) layers to stabilize a magnetization direction in the upper FM layer.

According to another embodiment shown in FIG. 11, there is a modified bottom shield 1x-1 wherein a second magnetic layer 5-1 has a trilayer stack 5a/5b/5c in which bottom ferromagnetic (FM) layer 5a and top FM layer 5c are anti-ferromagnetically (AF) coupled through middle AF coupling layer 5b. Thus, magnetization 5m1 in FM layer 5c is aligned parallel to magnetization 21m in the overlying junction shields, and is stabilized through AF coupling with FM layer 5a that has magnetization 5m2 anti-parallel to magnetization 5m1. AF coupling layer 5b is typically Ru, but may also be one of Rh, RhRu, Mo, Re, Os, or Ir. FM layer 5a is decoupled from magnetization (not shown) in first magnetic layer 1 because of the intermediate decoupling layer 4. Thus, bottom shield 1x-1 has a 1/4/5-1 stack of layers.

Figure 12:
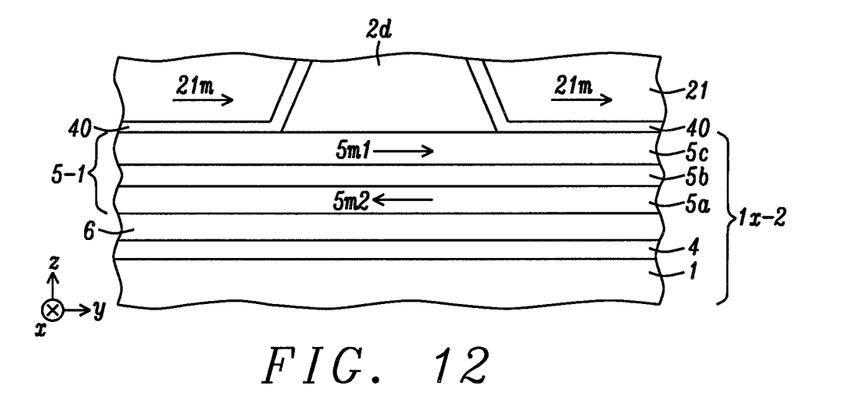
FIG. 12 is an ABS view of another embodiment of the present disclosure wherein the second magnetic layer in FIG. 8 is modified to include an AFM layer.

In another embodiment illustrated in FIG. 12, the bottom shield is modified with the insertion of AFM layer 6 between the decoupling layer 4 and bottom FM layer 5a in the second magnetic layer 5-1 to give a bottom shield 1x-2 with a 1/4/6/5-1 stack of layers. AFM layer 6 is advantageously used to pin magnetization 5m2 in FM layer 5a, which in turn further stabilizes magnetization 5m1 in FM layer 5c because of AF coupling between FM layers 5a, 5c. The AFM layer is preferably one of IrMn, PtMn, PdMn, NiMn, OsMn, RuMn, RhMn, RuRhMn, or MnPtPd.

Figure 13:
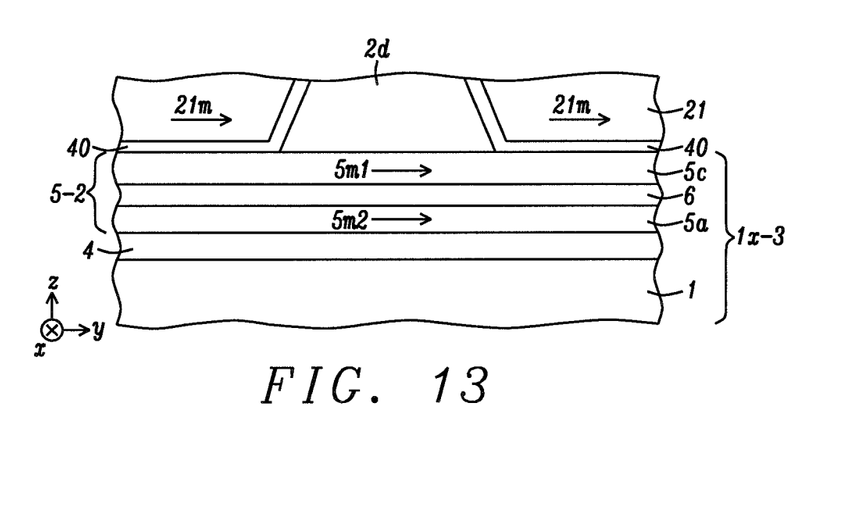
FIG. 13 is an ABS view of another embodiment of the present disclosure wherein the second magnetic layer in FIG. 11 is modified to include an AFM layer that adjoins a top surface of the decoupling layer.

In yet another embodiment shown in FIG. 13, the bottom shield is modified with the insertion of AFM layer 6 within the second magnetic layer to give a configuration 5-2 having a 5a/6/5c stack of layers where bottom FM layer 5a and top FM layer 5c are pinned and aligned in the same cross-track direction through contact with AFM layer 6. The resulting bottom shield 1x-3 has a 1/4/5a/6/5a stack of layers. In this case, magnetization 5m1 is stabilized because of FM layer 5c contact with the AFM layer 6 (also known as the AFM pinning layer) rather than indirectly through antiferromagnetic coupling with FM layer 5a as in the previous embodiment. In another embodiment, layer 5a may be made of a non-magnetic material.

Figure 14:
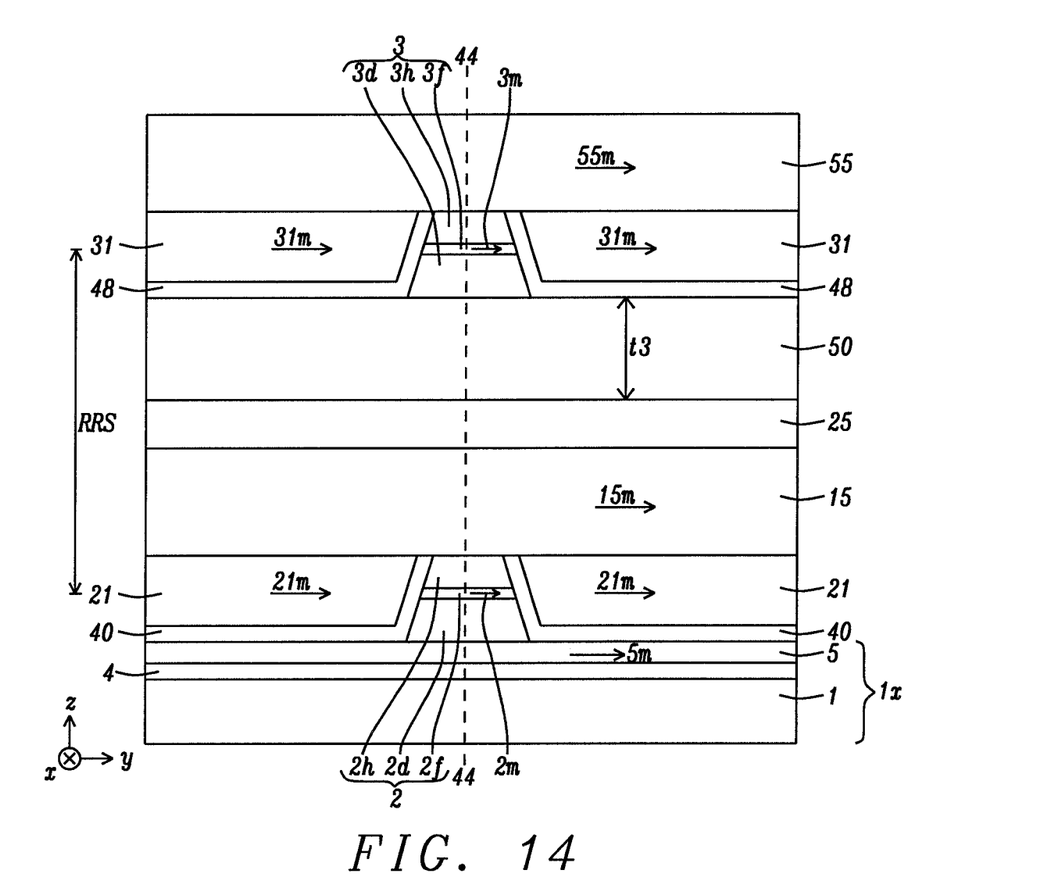
FIG. 14 is an ABS view of a 2DMR structure wherein a bottom shield in the bottom reader is comprised of a non-magnetic decoupling layer and a second magnetic layer sequentially formed on a first magnetic layer according to an embodiment of the present disclosure.

The present disclosure also encompasses an embodiment wherein the bottom shield in a 2DMR configuration has enhanced stabilization because of incorporating one of the previously described bottom shield designs 1x, 1x-1, 1x-2, or 1x-3. For example, FIG. 14 depicts a 2DMR design wherein the reader with MR sensor 2 and bottom shield 1x described in FIG. 8 serves as the bottom reader. All layers including MR sensor 3 in the top reader are retained from the 2DMR structure shown in FIG. 6. Only the bottom shield in the bottom reader is modified to provide additional stability to junction shield magnetization 21m and to free layer magnetization 2m. Furthermore, RRS is maintained from the previously described 2DMR structure.

Figure 15:
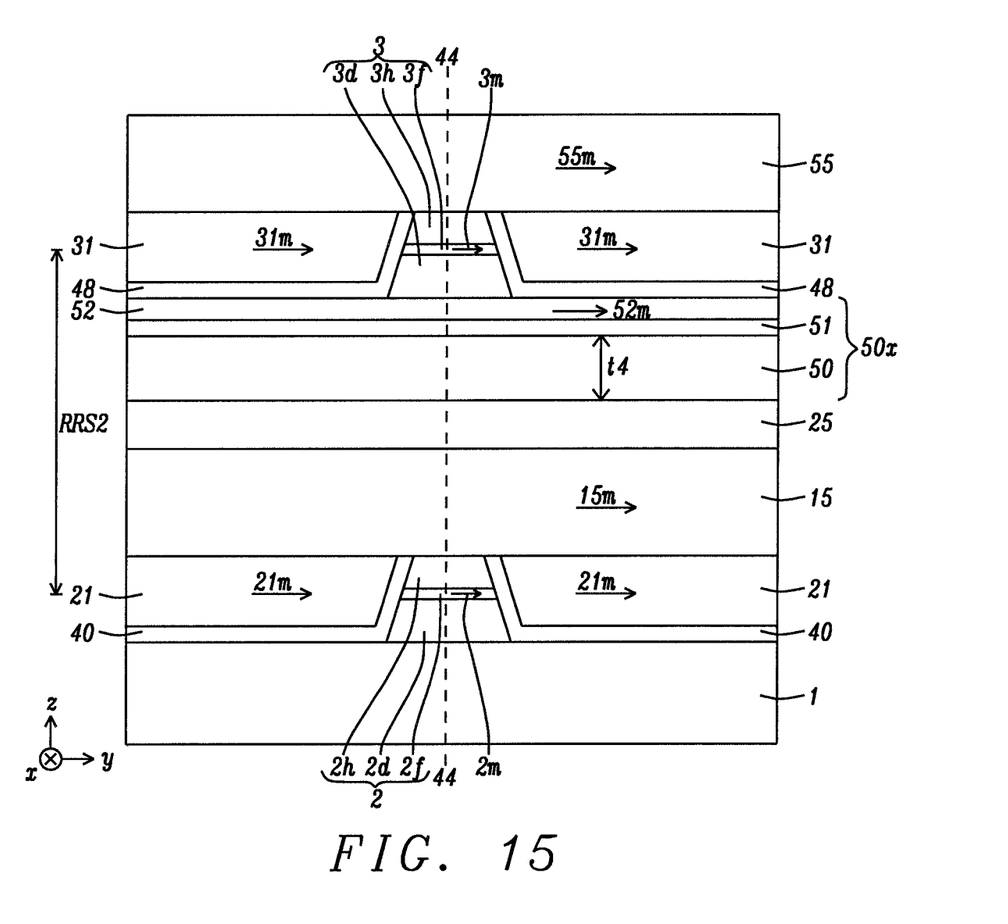
FIG. 15 is an ABS view of a 2DMR structure wherein a bottom shield in the top reader is comprised of a non-magnetic decoupling layer and a second magnetic layer sequentially formed on a first magnetic layer according to another embodiment of the present disclosure.

Referring to FIG. 15, the present disclosure anticipates an embodiment where the bottom shield in the second read head (top reader) is stabilized with a modified bottom shield 50x having a 50/51/52 stack of layers where decoupling layer 51 has the same properties and composition, and serves the same function as decoupling layer 4 in previous embodiments, and second magnetic layer 52 with magnetization 52m is essentially equivalent in composition and function to previously described second magnetic layer 5. In embodiments where thickness t4 of first magnetic layer 50 in bottom shield 50x is equal to thickness t3 of the first magnetic layer (bottom shield) in the previous 2DMR embodiment, BER may be degraded because RRS2>RRS. However, in preferred embodiments, thickness t4 is reduced so that RRS2 (FIG. 15)=RRS (FIG. 14), without significantly compromising BER in the second reader while enabling improved stabilization of magnetization 31m in junction shields 31, and of magnetization 3m in free layer 3f. In all embodiments described herein, one or both of first magnetic layer 1 and first magnetic layer 50 continue to protect the overlying MR sensor from stray (external) magnetic fields.

Although not shown, the present disclosure anticipates that both bottom shields 1, 50 in the 2DMR structure shown in FIG. 6 may be replaced with a modified bottom shield to provide enhanced stability to free layer magnetization 2m and free layer magnetization 3m, respectively. In other words, the 2DMR configuration shown in FIG. 14 may be modified with the replacement of bottom shield 50 with bottom shield 50x from the FIG. 15 embodiment.

The present disclosure also encompasses a method of fabricating a modified bottom shield 1x, 1x-1, 1x-2, or 1x-3 described previously. Note that the process flow for forming a MR sensor with junction shields on a bottom shield is found in related U.S. Pat. No. 9,230,577. With regard to FIG. 8, the first magnetic layer 1 is formed on a substrate such as dielectric layer 81 (FIG. 4) by an electroplating method, for example, to give a thickness t from 0.5 to 5 microns. Thereafter, the decoupling layer 4 is preferably deposited at the desired thickness t1 with a physical vapor deposition (PVD) process at a temperature from 25° C. to 250° C. Second magnetic layer may be electroplated on the decoupling layer, or optionally deposited by a PVD method, depending on the thickness t2, composition, and desired film uniformity. In some embodiments, bottom shield layers 4 and 5 may be formed in the same chamber with two sequential PVD steps without breaking a vacuum to minimize process time.

To demonstrate the benefits of the modified bottom shield described herein, an experiment was performed to compare a MR sensor stabilized using a conventional bottom shield with a MR sensor that is stabilized with a bottom shield 50x described previously with respect to FIG. 15. In particular, a 2DMR structure was fabricated with a top sensor in a second reader (R2) formed on a bottom shield having a trilayer (50/51/52) stack of layers according to an embodiment of the present disclosure, and a bottom MR sensor in a first reader (R1) formed on a conventional bottom shield consisting of a 2 micron thick NiFe layer. A plurality of 2DMR devices was formed on two different wafers before being probed with a quasi static tester where a resistance across a MR sensor is measured while scanning with an external magnetic field.

Figure 16A:
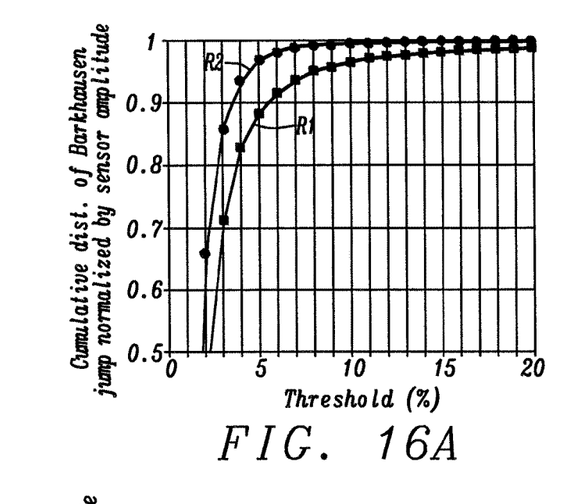
FIGS. 16A-16B are plots comparing magnetic performance in terms of cumulative distribution of Barkhausen jump normalized by sensor amplitude for readers with and without the modified bottom shield structure of the present disclosure.
Figure 16B:
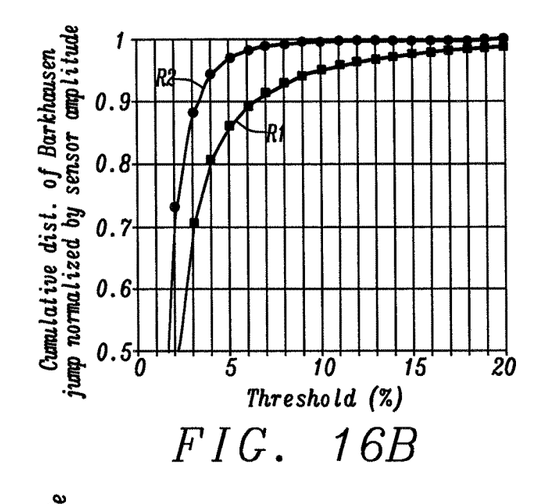

FIGS. 16A-16B are plots showing the cumulative distribution of Barkhausen jump normalized by sensor amplitude when an external magnetic field is scanned from −600 Oe to +600 Oe. Threshold is defined as the ratio of Barkhausen jump to the sensor amplitude. The plots are showing the percentage of heads that show jump values less than the threshold. In both wafer 1 (FIG. 16A) and wafer 2 (FIG. 16B), the second reader (top reader) clearly has significantly better distribution than the first reader (bottom reader). Note that the cumulative distribution encompasses results from a plurality of MR sensor devices across each wafer.

Figure 17A:
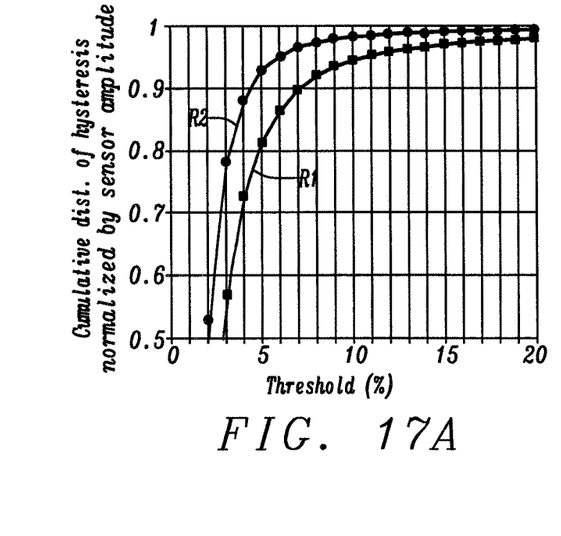
FIGS. 17A-17B are plots comparing magnetic performance in terms of cumulative distribution of hysteresis normalized by sensor amplitude for readers with and without the modified bottom shield structure of the present disclosure.
Figure 17B:
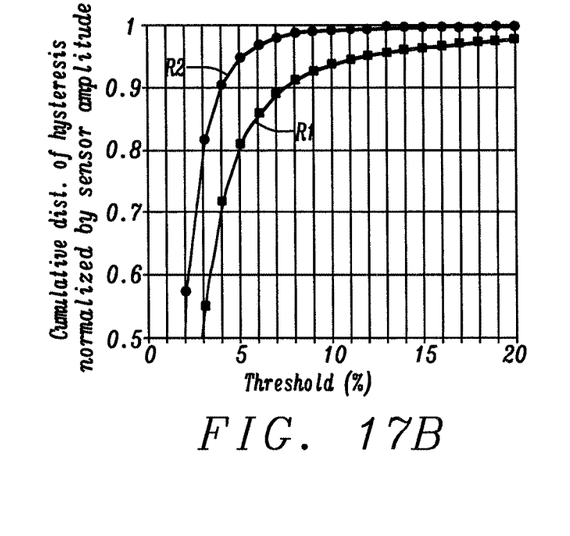

FIGS. 17A-17B are plots showing the cumulative distribution of hysteresis as a function of sensor amplitude when an external magnetic field is scanned from −600 Oe to +600 Oe. Here, threshold is defined as the cumulative distribution of hysteresis as a function of sensor amplitude. Again, for both wafer 1 (FIG. 17A) and wafer 2 (FIG. 17B), R2 has significantly better performance than R1. Accordingly, R2 is expected to have SNR that is substantially improved over SNR for R1. More importantly, R2 will have better stability after excitation by a magnetic field.

In summary, we have disclosed a scheme for improved stabilization in a MR sensor wherein a bottom shield has improved stability because of a multilayer stack wherein an uppermost magnetic layer adjoining junction shields in the MR sensor is stabilized compared with a conventional single layer bottom shield because of decoupling from a bottommost magnetic layer that is prone to domain wall motion (instability). Moreover, in some embodiments additional stability is provided through AF coupling between the upper magnetic layer and a middle magnetic layer in the multilayer stack, and through insertion of an AFM pinning layer in the multilayer stack. When the improved bottom shield design is incorporated in one or both of a first reader (bottom reader) and a second reader in a 2DMR structure, or in a single reader structure, an enhanced sensor performance is realized in terms of better signal to noise ratio, which helps to improve bit error rate (BER) performance. Moreover, improved sensor stability is also realized because of the improved shield stability.

While this disclosure has been particularly shown and described with reference to, the preferred embodiment thereof, it will be understood by those skilled in the art that various changes in form and details may be made without departing from the spirit and scope of this disclosure.

I claim:

1. A magnetic read head structure formed on a slider in a head gimbal assembly (HGA), comprising:
   (a) a first magnetoresistive (MR) sensor formed on a first bottom shield and with a front side at an air bearing surface (ABS), and wherein the first MR sensor has a first free layer with a first magnetization in a first cross-track direction, and sidewalls that extend from a top surface thereof to the first bottom shield;
   (b) the first bottom shield, comprising:
      (1) a bottommost magnetic layer having a first thickness (t), a width (w) between two sides thereof, and a height (h) between a front side at the ABS and a backside;
      (2) an uppermost magnetic layer that is a single layer and has a second magnetization in the first cross-track direction, and having a second thickness that is substantially less than the first thickness; and (3) a non-magnetic decoupling layer that adjoins a top surface of the bottommost magnetic layer, and contacts a bottom surface of the uppermost magnetic layer, and wherein the non-magnetic decouplinq layer decouples the second magnetization from a magnetization in the bottommost magnetic layer; and (c) a first junction shield that is adjacent to the first MR sensor sidewalls, and having a third magnetization in the cross-track direction that provides a bias field in the cross-track direction to stabilize the first magnetization in the free layer.

2. The magnetic read head structure of claim 1 wherein the first MR sensor is part of a combined read/write head.

3. The magnetic read head structure of claim 1 wherein the non-magnetic decoupling layer has a thickness from about 1 nm to 0.5 micron and is comprised of a conductive material that is one or more of Cu, Al, W, Cr, Ta, Ru, Pt, and Pd, or is an insulating material that is $Al_2O_3$, $SiO_2$, MgO, $Ta_2O_5$, or $TiO_2$.

4. The magnetic read head structure of claim 1 wherein the uppermost magnetic layer in the bottom shield has a magnetic saturation (Ms) value from 5 kiloGauss (kG) to 15 kG, and is one or more of FeCo, FeCoNi, FeCoN, NiFe, NiFeW, NiFeCr, NiFeMo, or a FeCoR alloy where R is one or more of Mo, Zr, Nb, Hf, Ru, Pt, Re, and Pd.

5. The magnetic read head structure of claim 4 wherein the uppermost magnetic layer has a thickness from about 1 nm to 0.5 micron.

6. The magnetic read head structure of claim 1 wherein the uppermost magnetic layer has a width and a height essentially equal to a width and a height, respectively, of the bottommost magnetic layer.

7. The HGA of claim 1 wherein a suspension has a flexure to which the slider is joined, a load beam with one end connected to the flexure, and a base plate connected to the other end of the load beam.

8. A magnetic recording apparatus, comprising:
(a) the HGA and magnetic read head structure of claim 1;
(b) a magnetic recording medium positioned opposite to the slider;
(c) a spindle motor that rotates and drives the magnetic recording medium; and
(d) a device that supports the slider, and that positions the slider relative to the magnetic recording medium.

* * * * *